US005958312A

United States Patent [19]

Stripp et al.

[11] Patent Number: 5,958,312

[45] Date of Patent: Sep. 28, 1999

[54] PROCESS FOR THE PARTIAL RECONSTRUCTION OF THE REFRACTORY LINING OF THE WALL OF STEEL CASTING LADLES

[75] Inventors: Heinz Stripp, Dinslaken; Wolfgang Rasim, Wesel; Horst Tiemann, Iserlohn, all of Germany

[73] Assignee: DOLOMITWERKE GmbH, Wulfrath, Germany

[21] Appl. No.: 08/691,977

[22] Filed: Aug. 2, 1996

Related U.S. Application Data

[63] Continuation-in-part of application No. PCT/EP95/00398, Feb. 3, 1995.

[30] Foreign Application Priority Data

Feb. 3, 1994 [DE] Germany .............................. 44 03 271

[51] Int. Cl.$^6$ .............................. B28B 7/32; B32B 35/00; F27D 1/16

[52] U.S. Cl. .............................. 264/30; 264/36; 264/315; 266/281; 425/11; 425/14

[58] Field of Search .............................. 264/30.36, 313, 264/315; 266/281; 425/11, 14, 12

[56] References Cited

U.S. PATENT DOCUMENTS

| | | | |
|---|---|---|---|
| 1,675,735 | 7/1928 | Stohr | 264/30 |
| 1,703,519 | 2/1929 | Dovel | 264/30 |
| 3,230,685 | 1/1966 | Tiefenthal | 264/30 |
| 3,259,672 | 7/1966 | Oswald et al. | 264/30 |
| 3,458,607 | 7/1969 | Sullivan et al. | 264/30 |
| 3,477,682 | 11/1969 | Shupe | 264/30 |
| 3,716,316 | 2/1973 | Dekker et al. | 264/30 |
| 3,877,673 | 4/1975 | Bisinella et al. | 249/83 |
| 4,094,938 | 6/1978 | Kolpakov et al. . | |
| 4,726,570 | 2/1988 | Phillips et al. | 264/30 |
| 5,279,092 | 1/1994 | Williamsen et al. | 52/514 |

FOREIGN PATENT DOCUMENTS

| | | |
|---|---|---|
| 0693484 | 7/1967 | Belgium . |
| 1358186 | 3/1964 | France . |
| 3006149 | 8/1980 | Germany . |
| 53-102803 | 7/1978 | Japan . |
| 57-190764 | 11/1982 | Japan . |
| 0447487 | 3/1968 | Switzerland . |
| 0178955 | 3/1966 | U.S.S.R. . |

*Primary Examiner*—Karen Aftergut
*Attorney, Agent, or Firm*—Nils H. Ljungman & Associates

[57] ABSTRACT

It was difficult until now to carry out intermediate repairs of monolithic refractory lining walls of steel casting and handling ladles when the slag area of the lining was worn before other areas. According to this new process for reconstructing the refractory lining in the upper area of the wall, repairs may be economically carried out in that the gap between the lower end of the template and the lining that projects under the area to be reconstructed is sealed by inflating a hose-like sealing body and by deflating again the sealing body before removing the template. This process is useful for steel casting and handling ladles and for similar metallurgical vessels.

8 Claims, 8 Drawing Sheets

PROCESS FOR THE PARTIAL RECONSTRUCTION OF THE REFRACTORY LINING OF THE WALL OF STEEL CASTING LADLES

CONTINUING APPLICATION DATA

This application is a Continuation-In-Part application of International Application No. PCT/EP 95/00398, filed on Feb. 3, 1995, which claims priority from German Patent Application No. P 44 03 271.4, filed on Feb. 3, 1994. International Application No. PCT/EP 95/00398 was pending as of the filing date of this Application and the U.S. was an elected state in International Application No. PCT/EP 95/00398.

BACKGROUND OF THE INVENTION

1. Field of the Invention

This invention generally relates to a process for the partial reconstruction of the refractory lining in the upper zone of the wall area of a ladle for casting and treating steel or similar metallurgical vessels, as well as a device for the performance of the process. The invention also generally relates to a process for the manufacture of a monolithic refractory lining of the wall and bottom of the ladle, as well as a device for the performance of the process.

2. Background Information

Similar refractory linings of the prior art for metallurgical vessels generally include a permanent lining and a working lining. Fireclays or insulating bricks are conventionally used to construct the permanent lining, and are applied on the inside of the steel shell of the vessel. The working lining is applied on top of the permanent lining, and as it subsequently comes into contact with the molten steel, it is worn away by erosion, in particular as a result of the movement of the metal bath, and by chemical attack (erosion) which is caused in particular by the slags which float on top of the molten metal.

The working lining can be constructed using refractory bricks or it can be installed in the form of a castable refractory mix which solidifies to form a monolithic layer. Combinations of these two types of linings are also possible.

In terms of the return on investment, taking into consideration both the cost of materials and useful life of the lining, as well as the time and human resources required to install the lining, a monolithic lining frequently turns out to be more economical than a lining which consists of refractory bricks.

Changes in modern methods of manufacturing steel have placed particularly stringent requirements on the refractory lining of casting and treatment ladles. In particular, after the transition to continuous casting, the higher tapping temperatures and the longer hold times of the molten steel in the ladle result in increased wear to the refractory lining.

Since, as a rule, the amount of wear differs in different areas of the wall and bottom of the ladle, the lining is frequently divided into zones which have different thicknesses of the working lining and/or various grades of refractory materials which have different strengths or characteristics (wear resistances.)

After the ladle has been filled with molten steel and emptied numerous times, the working lining is either completely removed and replaced when the ladle has reached the end of its useful life or, in the event of premature wear, it is repaired only in the damaged zones. If, in the upper portion of the ladle approximately 1 m from the upper edge, the working lining is exposed to chemically corrosive slags, the lining in this slag zone must typically be removed and replaced, or at least repaired, several times during the life of the ladle. The bottom frequently exhibits signs of wear sooner than the wall, in particular in the impact area of the casting stream and in the vicinity of the gas purging sets. In that case, the bottom lining must typically be removed and replaced several times during the life of the ladle.

In accordance with a known lining method, the working lining of a steel casting ladle is constructed using refractory castables. For the wall lining, this method requires a template which matches the internal contour of the finished, cast working lining. The castable refractory mix is poured into the space between the permanent lining and the template.

For a complete relining, a template is used which extends from the bottom to the upper edge of the ladle. To facilitate installation, the template can be divided in the middle. Mixers, pumps and internal vibrators are generally used to perform the casting process. The casting should be performed continuously, over a period of about three hours for example, to prevent any hardening in the surface area. The vibrators are used to prevent the formation of cavities and voids and to achieve good densification. When the mix has set, e.g. after about 24 hours, the template can be removed.

When a monolithic lining of the entire ladle wall is installed, one disadvantage is that if premature wear occurs in the area exposed to the slag, interim repairs to this area are so difficult that this area must continue to be lined with refractory bricks, as described in Stahl u. Eisen Special, Oct. 1992, pp. 117–120, which is incorporated by reference herein.

When the wall and bottom are lined with a monolithic lining, and if premature wear occurs on the bottom, it has been found to be disadvantageous that, when the damaged portion of the bottom lining is removed, damage generally occurs to the rest of the bottom lining. Generally, the lower portion of the otherwise intact wall lining is damaged during the removal of the bottom lining, because the lining of the wall and of the bottom is a monolith. Consequently, that can mean that it is necessary to remove a major part of the wall lining prematurely.

OBJECT OF THE INVENTION

The object of this invention, on a steel casting and treatment ladle with a monolithic refractory lining, is a method which makes it economically possible to restore the upper area of the wall lining using castable refractory mix. Another object, generally, of the invention is to install the bottom lining so that it becomes possible to remove the bottom lining between the walls without damage to the wall areas, in a manner that is economically advantageous.

SUMMARY OF THE INVENTION

The present invention teaches that the first of these objects can be accomplished by sealing the gap between the lower end of the template and the working lining which extends below the area to be restored by inflating a hose-shaped sealing body, and by deflating the sealing body before the template is removed.

One advantage of the method proposed by the invention is that the working lining need not be entirely removed in the upper area. Nor is any special equipment required to prepare the surface. Essentially all that is necessary is to use the refractory removal machine, which is already in place and must be used anyway, with a flat chisel to remove any steel remnants and other caked material or slag. The setup times and material requirements are less than when the entire lining has to be removed and replaced with bricks. The permanent lining underneath is not damaged.

In one advantageous embodiment of a device which can be used for the performance of the process of the present invention, there is a ring, which is offset toward the inside, attached to the lower end of the template, and there is a hose-shaped inflatable sealing body. The ring is attached to the periphery of the hose-shaped inflatable sealing body. Also, there is an elastic protective shell which is fastened to the lower edge of the template, with the shell surrounding the sealing body on the outside. In addition, the elastic protective shell presses the deflated sealing body against the ring.

To repair the upper zone of the wall, high-alumina castable refractory compounds or refractory mortar can be used.

The present invention also teaches that the second of these objects can be accomplished if, at the beginning of the installation of the castable refractory compound in the wall area, a hose-shaped, inflatable sealing body which is fastened to the lower portion of the template is inflated so that it seals the template up to the height which corresponds to the desired thickness of the bottom. As soon as the castable refractory compound in the lower portion of the wall has set sufficiently, the sealing body is deflated and removed. Then, the castable refractory compound is introduced up to the desired level in the floor area.

In one advantageous embodiment of a device which can be used for the performance of the process, the template stands on three refractory bodies which are distributed over the periphery, and which have the same height as the desired thickness of the bottom lining. In the spaces between these refractory bodies, hose-shaped sealing bodies are attached to the lower edge of the template. These hoses can be inflated and, when the process has been completed, they can be deflated and removed.

Following the inflation of the sealing bodies, first the wall lining is poured, during which process the sealing bodies prevent the mix from running onto the bottom. When the wall lining has been completely poured, up to the edge of the ladle, the bottom portion of the lining which is in contact with the sealing bodies, begins to solidify slightly, starting from the surface, to a point where the sealing bodies can be deflated and removed. Then, before the template is removed, the bottom can be poured up to a specified height. The bottom lining in this manner no longer forms a monolith with the wall lining, but there is a design breaking point. Since there are no joints, strictly speaking, there is also no infiltration of molten steel during the use of the ladle. Following the setting time, which can generally last up to about ten hours, the template can be extracted from the ladle, and the ladle lining can be heated to the operating temperature.

In summary, one aspect of the invention resides broadly in a method of repairing a refractory lining of a metallurgical vessel, the refractory lining having a first wall area to be repaired and a second wall area, the first wall area being disposed above the second wall area; the method comprising the steps of: positioning a template adjacent the first wall area, having an area to be repaired, of the refractory lining of the metallurgical vessel, positioning means for blocking adjacent at least a portion of the second wall area, not needing repair, of the metallurgical vessel, blocking the second wall area of the metallurgical vessel with the blocking means to minimize castable refractory mix leaving the area to be repaired, pouring the castable refractory mix into the region to be repaired of the first wall area of the metallurgical vessel, and permitting the castable refractory mix to set in the region to be repaired of the first wall area of the metallurgical vessel.

Another aspect of the invention resides broadly in a device for repairing the upper area of the refractory wall of a metallurgical vessel with castable refractory mix comprising: a cylindrical template of an outer diameter essentially equal to the inner diameter of the refractory wall to be repaired, and means for blocking the upper area to be repaired of the metallurgical vessel and for minimizing leakage of castable refractory mix.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the accompanying figures.

DESCRIPTION OF THE PREFERRED EMBODIMENT

Figure 1:
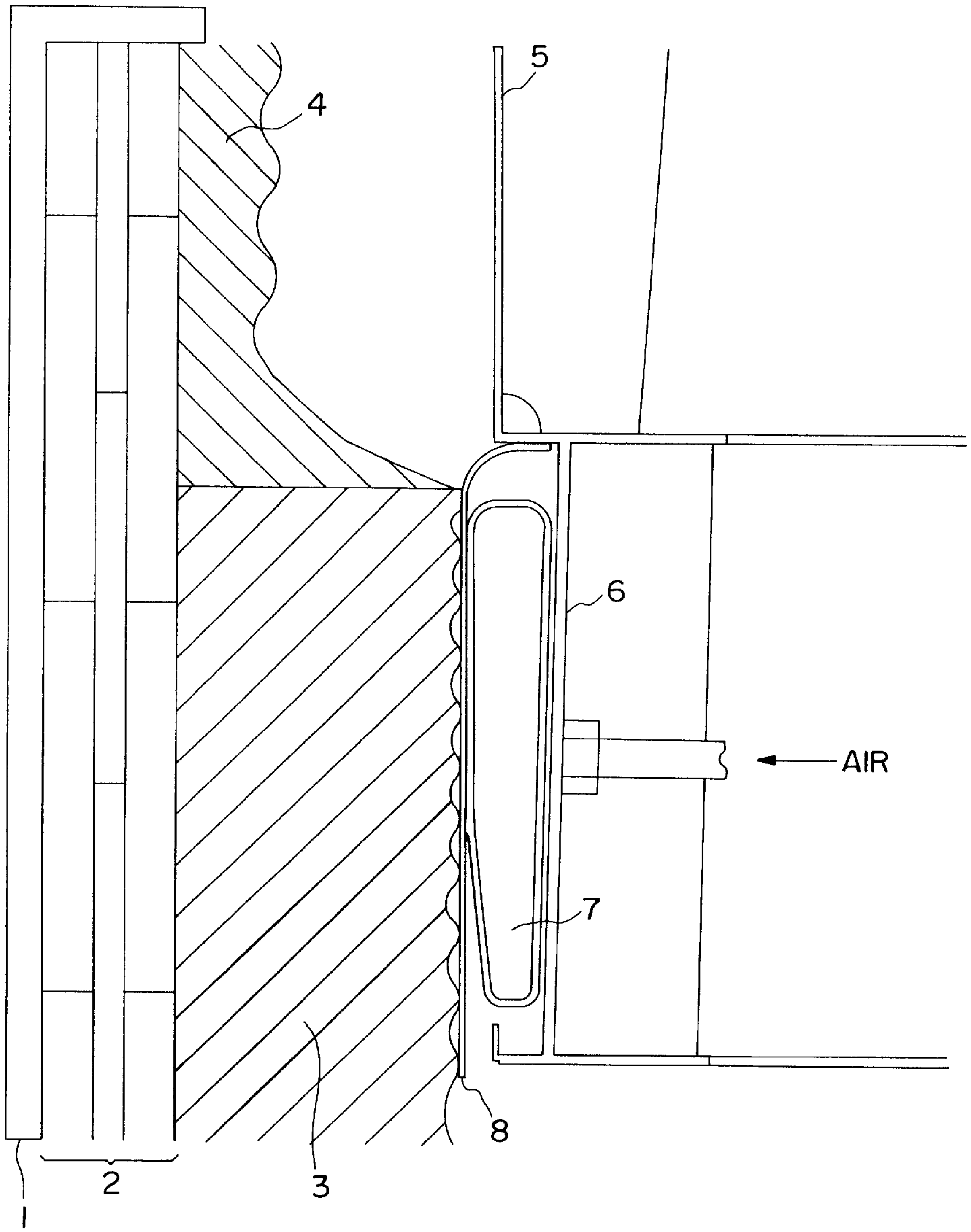
FIGS. 1 and 1*a* are schematic illustrations of the wall area of a metallurgical vessel.
Figure 1A:
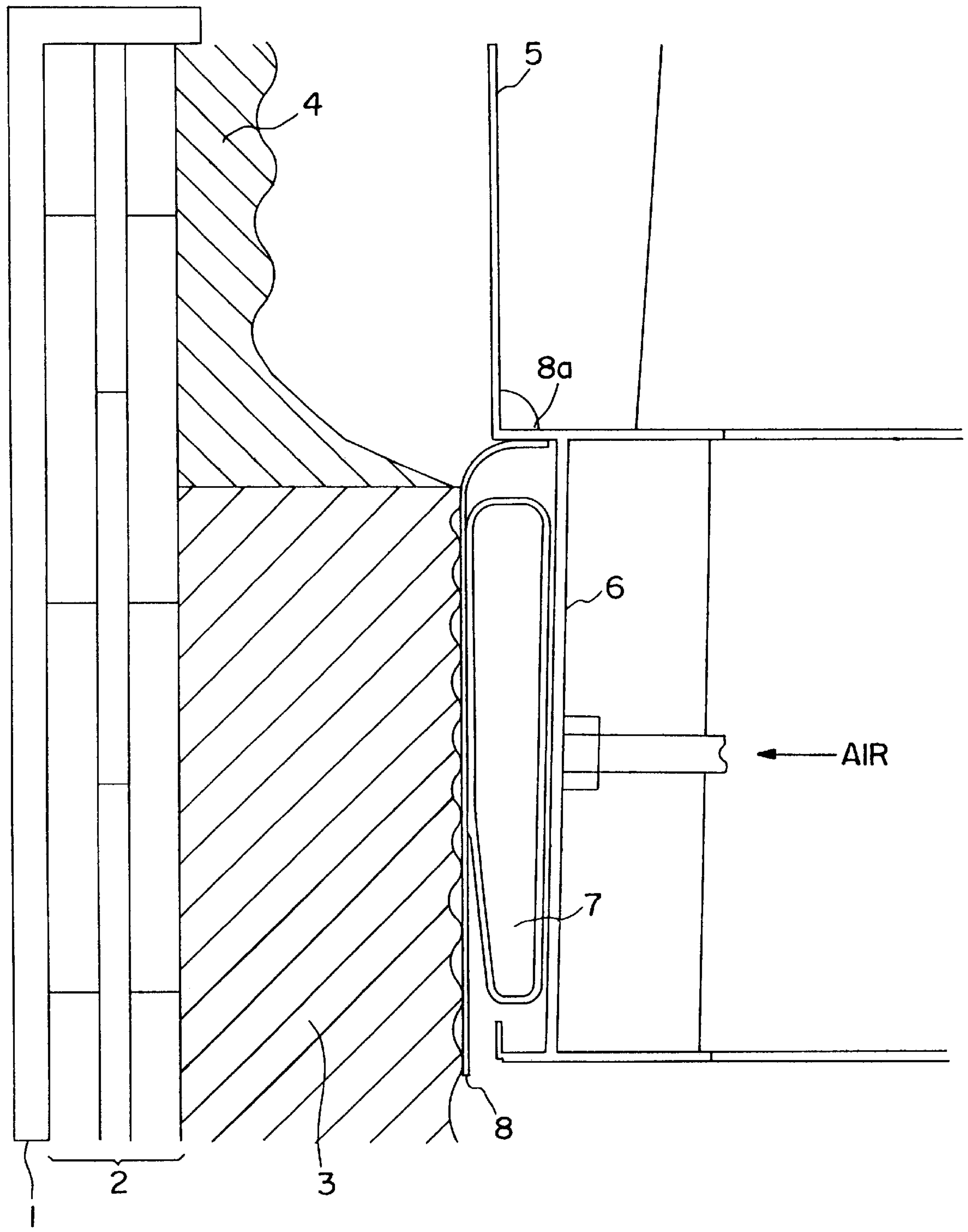

FIG. 1 is a schematic illustration of the steel shell 1, the permanent lining 2 and the working lining 3 and 4. The working lining, in the lower area 3, still has sufficient thickness remaining. The working lining in the upper area 4, however, has been worn away to the point where the ladle can no longer be used. The working lining 4 in the upper area has already been cleaned of remaining bits of steel, slag and other materials caked thereto. The template 5 is suspended in the ladle from above. Attached to the base of the template 5 is a ring 6 which is offset toward the inside. Fastened to the ring 6 is a hose-shaped sealing body 7 made of flexible material. The sealing body 7 is inflatable. In accordance with one embodiment, the sealing body 7 can be made of plastic-reinforced rubber. To protect against damage, there is a protective shell 8 between the working lining 3 and the sealing body 7. This protective shell 8 is fastened by means of its upper edge, e.g. by means of a tab, to the lower edge of the template 5. The protective shell 8 is made of laceration resistant, or tear resistant, flexible material, and is cut so that it exerts a bias on the sealing body 7. In accordance with one embodiment of the present invention, the tab can be considered to be the tab 8*a* shown in FIG. 1*a*.

Following the insertion of the template 5, the sealing body 7 is inflated so that it comes into sealed contact against the working lining in the lower area 3, where the lining makes the transition to the upper area 4 of the working lining.

The template 5 is then ready for the repair of the working lining in the upper area 4 by pouring castable refractory mix into the space between the remaining lining and the wall of the template 5.

Figure 2:
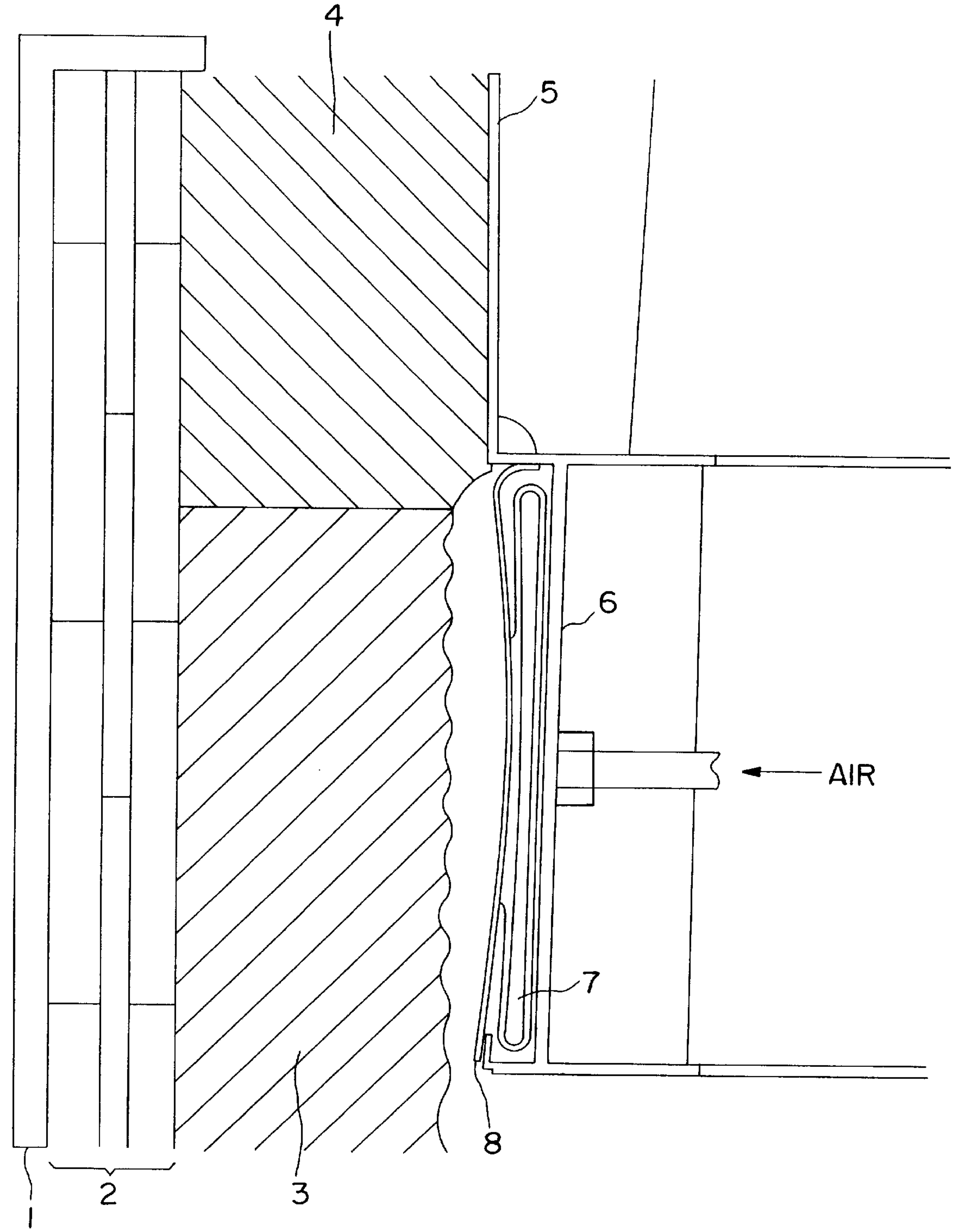
FIG. 2 is also a schematic illustration of the wall area of a metallurgical vessel.

FIG. 2 shows the situation after the completion of the repair process. The hose-shaped sealing body 7 is no longer pressurized. The protective shell 8 is no longer in contact against the working lining in the lower area 3, but as a result of its internal bias presses the hose-shaped sealing body 7 against the ring 6 on the base of the template 5. The template 5 can now be extracted upward, without damage to the sealing body 7 or to the newly-poured working lining in the upper area 4.

Figure 3:
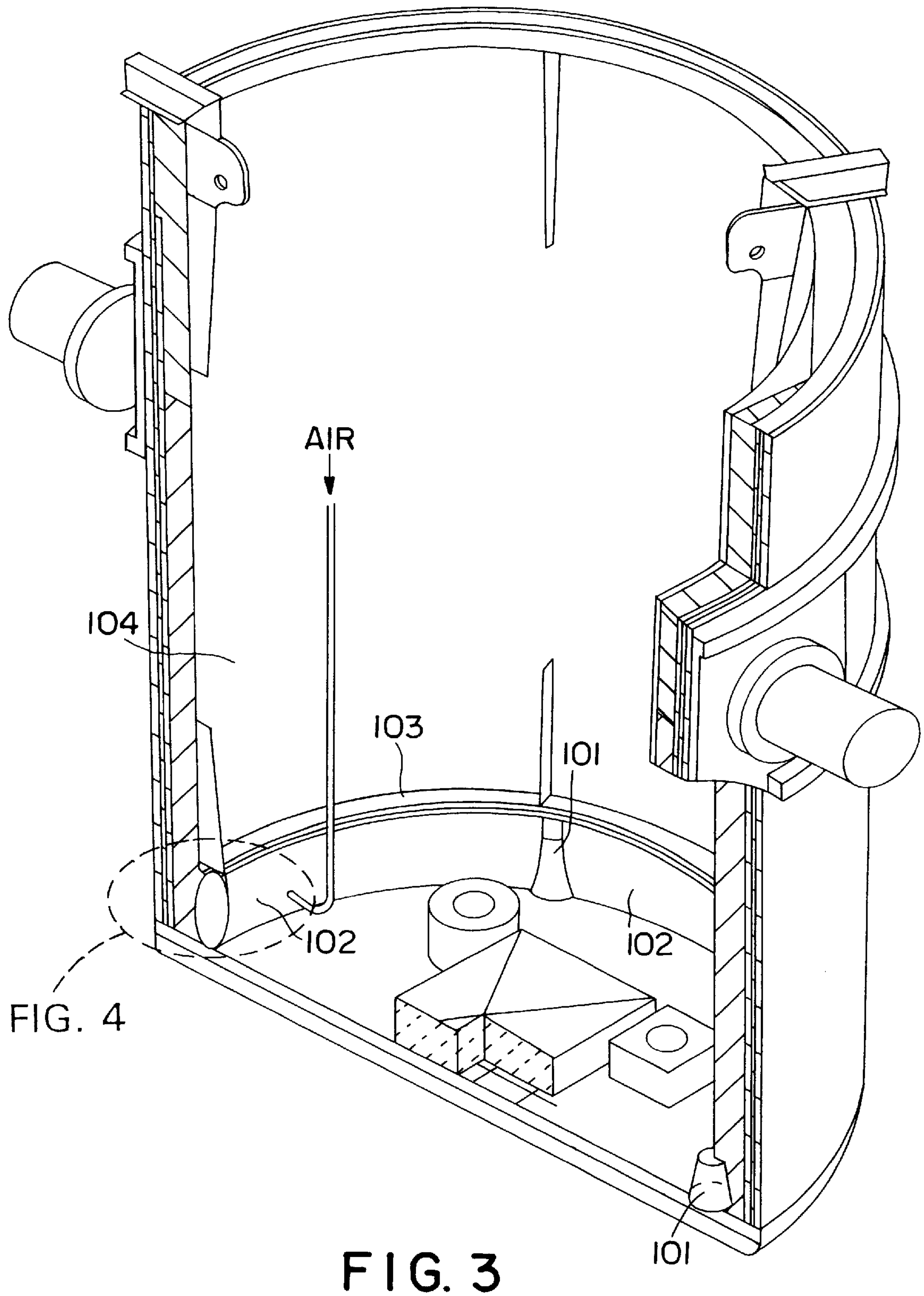
FIGS. 3 and 3*a* are perspective views of a metallurgical vessel.
Figure 3A:
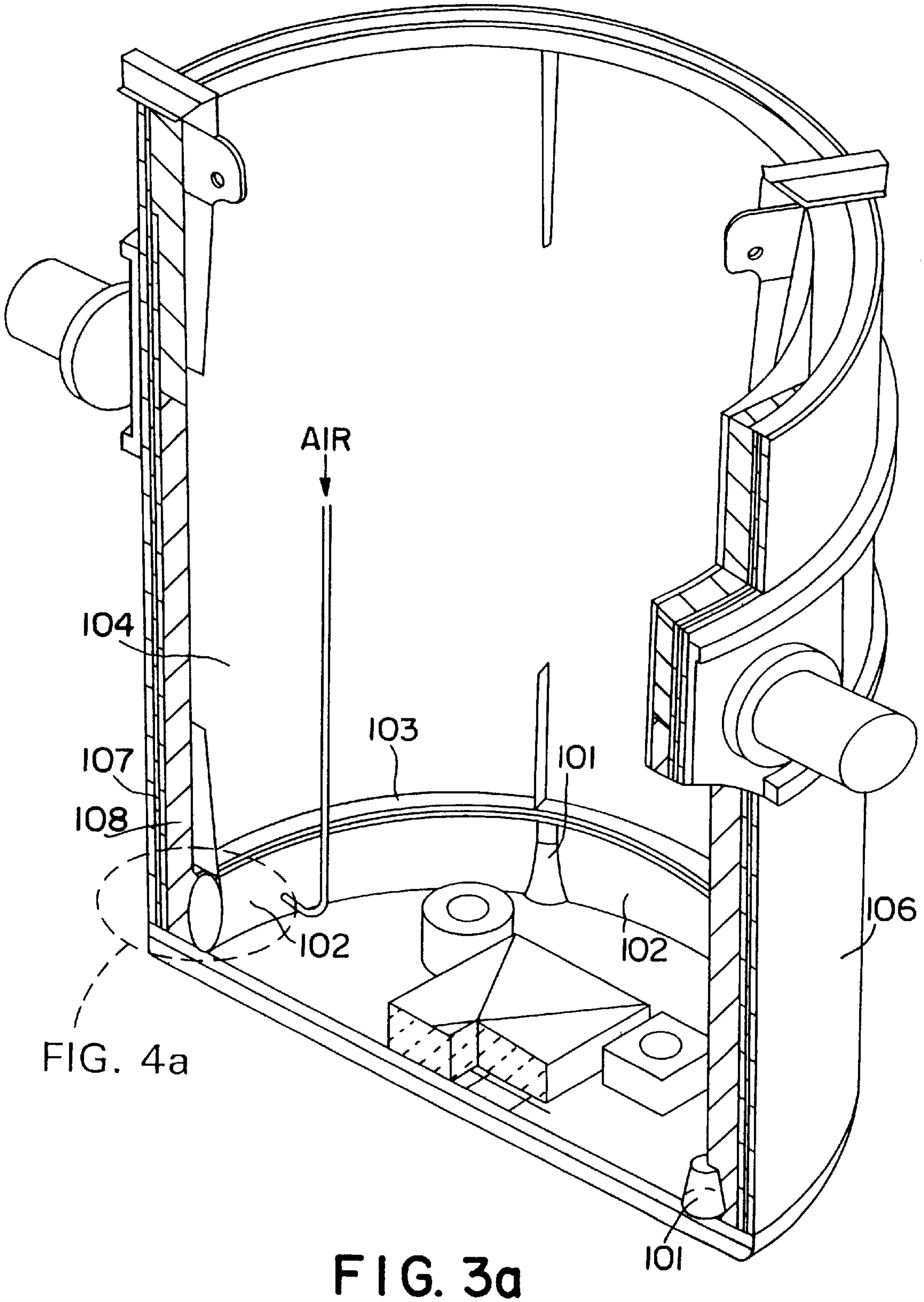

FIG. 3 is a view in perspective of a steel casting and treatment ladle with (from outside to inside) the steel shell 106, the permanent lining constructed of bricks 107, the working lining 108 made of refractory mix in the wall, and the template 104. The bottom of the ladle has not yet been lined with monolithic compound. The figure shows a gas purging or gate brick and a taphole pocket block or brick as well as a pre-fabricated component cast from a material which contains a high concentration of alumina and which acts as an impact plate on the permanent lining.

The template 104 stands on refractory support bodies 101 which have the same height as the pocket blocks. On the lower edge of the template 104, on the inside, there is a strip 103 to which hose-shaped, inflatable sealing bodies 102 made of flexible material are fastened. The sealing bodies 102 can be made of plastic-reinforced rubber, for example.

Figure 4:
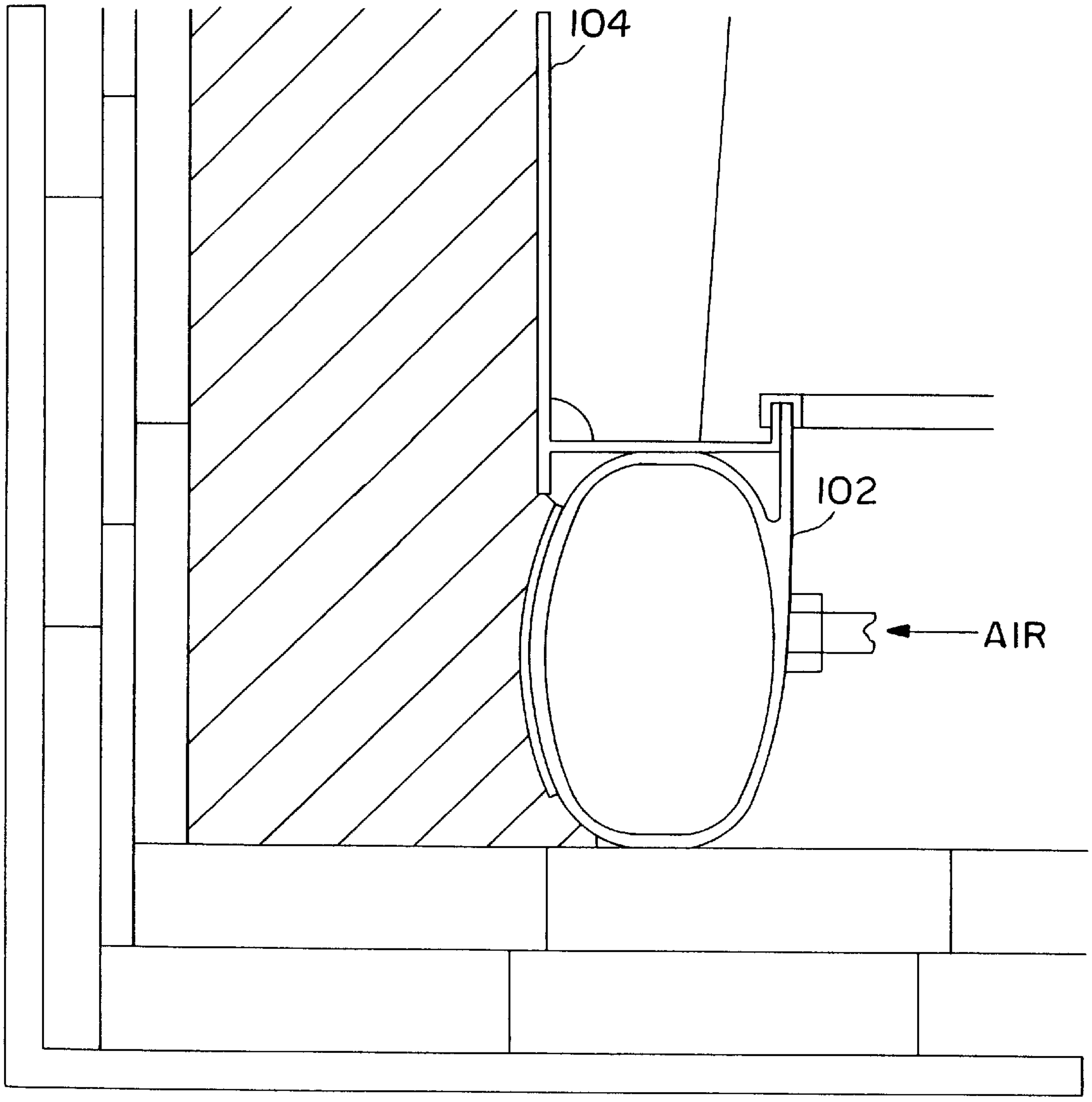
FIGS. 4 and 4*a* show longitudinal cross sections of the bottom of a metallurgical vessel.
Figure 4A:
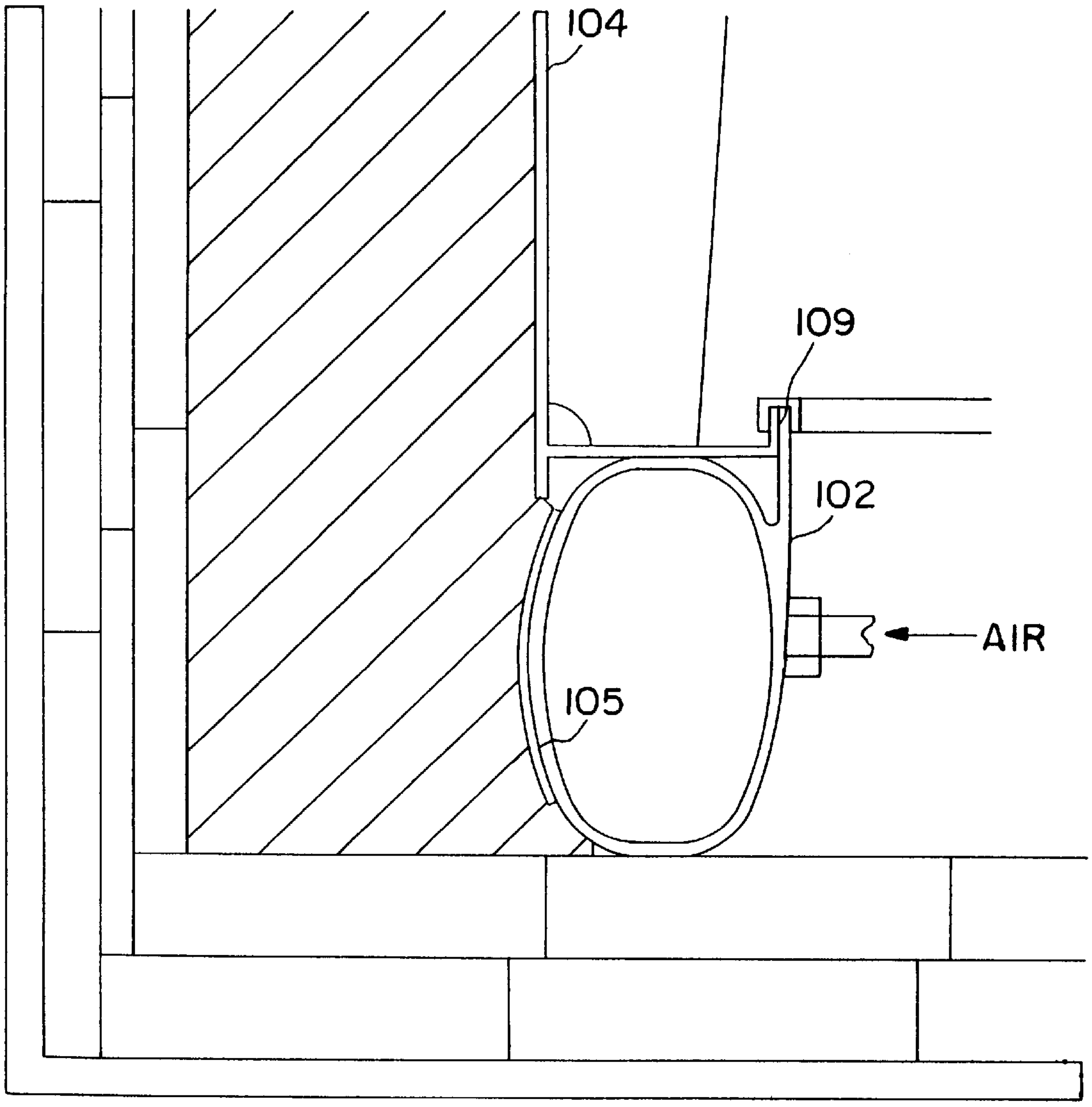

FIG. 4 is a longitudinal section through the ladle showing the vicinity of the bottom end of the template 104. Somewhat above the lower edge of the template 104, a ring 109 is attached which supports a strip 103 on the inside. Fastened to the strip 103 is a hose-shaped sealing body 102 which is made of flexible material. To protect against damage, the sealing body 102 is provided on the side facing the refractory material with a protective strip 105 laceration or tear resistant, flexible material.

Figure 5:
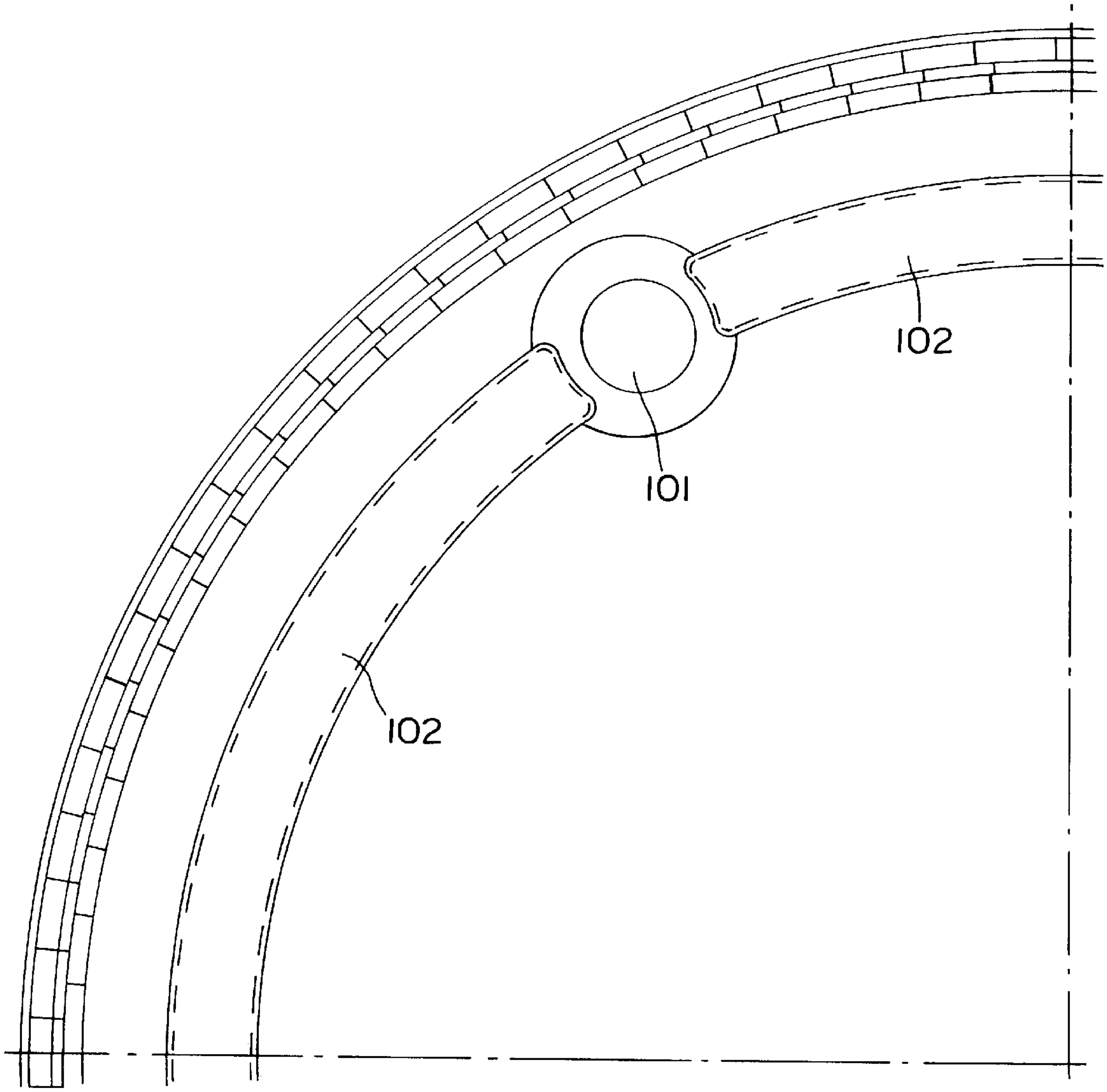
FIG. 5 is a plan view of the bottom of a metallurgical vessel.

FIG. 5 is a plan view of the bottom of the ladle, and shows a section of the refractory support body 101 which can, for example, be realized in the shape of a truncated cone, and two sealing bodies 102 which are cut so that, when inflated, they are in sufficiently tight contact without any additional means against the support body 101.

One feature of the invention resides broadly in the process for the restoration of a refractory lining in the upper portion of the wall area of a steel casting and treatment ladle, by pouring a castable refractory mix into the ring-shaped space between a template and the remaining working lining, characterized by the fact that the space between the lower end of the template and the working lining which extends below the area to be restored is sealed off by inflating a hose-shaped sealing body 7, and the sealing body 7 is deflated again before the removal of the template.

Another feature of the invention resides broadly in the device for the performance of the process characterized by the fact that attached to the lower end of the template is a ring 6 which is offset toward the inside, and the hose-shaped, inflatable sealing body is attached on the periphery of the ring 7.

Yet another feature of the invention resides broadly in the device characterized by the fact that fastened to the lower edge of the template is an elastic protective shell 8 which surrounds the sealing body on the outside.

Still another feature of the invention resides broadly in the device characterized by the fact that the elastic protective shell 8 presses the deflated sealing body 7 against the ring 6 which is offset toward the inside.

Another feature of the invention resides broadly in the process for the manufacture of a refractory lining of the wall and bottom of a steel casting and treatment ladle, by pouring a castable refractory mix into the ring-shaped space between a template and the permanent lining, characterized by the fact that at the beginning of the introduction of the castable mix into the wall area, a hose-shaped, inflatable sealing body fastened to the bottom portion of the template is inflated so that it seals the template up to the level which corresponds to the desired thickness of the bottom, and that as soon as the castable refractory mix has set sufficiently in the lower wall area, the sealing body is deflated and removed, and then the castable refractory mix is introduced up to the desired height in the bottom area.

Another feature of the invention resides broadly in the device for the performance of the process characterized by the fact that a hose-shaped, inflatable sealing body is attached on the lower, inwardly-retracted edge of the template.

Yet another feature of the invention resides broadly in the device characterized by the fact that the template stands on at least three refractory bodies which are distributed over the periphery, and which have the same height as the desired thickness for the bottom lining, and that in the spaces between these refractory bodies, hose-shaped sealing bodies are attached on the lower edge of the template, which sealing bodies can be inflated, deflated and then removed.

Some examples of refractory mixtures which may be utilized in accordance with the embodiments of the present invention, may be found in the following U.S. Pat. No. 5,302,563, which issued to Rumpeltin and Dody; U.S. Pat. No. 5,284,808, which issued to Damiano, et al.; U.S. Pat. No. 5,217,929, which issued to Taft; U.S. Pat. No. 5,212,126 which issued to Fitch and Kleeb; and U.S. Pat. No. 5,204, 298, which issued to Yaoi, et al.

Some examples of ladles, and components associated therewith, which may be utilized in accordance with the embodiments of the present invention, may be found in the following U.S. Pat. No. 5,465,943, which issued to Rinnhofer, et al.; U.S. Pat. No. 5,318,277, which issued to Brown, et al.; U.S. Pat. No. 5,011,120, which issued to Bear; and No. U.S. Pat. 4,928,862, which issued to White.

Other examples of ladles, and components associated therewith, which may be utilized in accordance with embodiments of the present invention, may be found in the following U.S. Pat. No. 5,409,139, which issued to Daussan, et al.; U.S. Pat. No. 5,395,096, which issued to Moreira, et al.; and U.S. Pat. No. 5,176,873, which issued to Daussan, et al.

Examples of inflatable sealing bodies, which may be utilized in accordance with embodiments of the present invention may be found in the following U.S. Pat. No. 5,279,092, which issued to Williamsen and Weddendorf; and U.S. Pat. No. 5,399,301 which issued to Menendez, et al.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein are hereby incorporated by reference as if set forth in their entirety herein.

The corresponding foreign and international patent publication applications, namely, Federal Republic of Germany Patent Application No. P 44 03 271.4, filed on Feb. 3, 1994, having inventors Heinz Stripp, Wolfgang Rasim, and Horst Tiemann, and DE-OS P 44 03 271.4 and DE-PS P 44 03 271.4 and International Application No. PCT/EP95/00398, filed on Feb. 3, 1995, are hereby incorporated by reference as if set forth in their entirety herein.

The corresponding foreign and international patent publication applications, namely, Federal Republic of Germany Patent Application No. 44 03 270.6, filed on Feb. 3, 1994, having inventors Heinz Stripp, Horst Tiemann, and Roland Kessler, and DE-OS 44 03 270.6 and DE-PS 44 03 270.6 and International Application No. PCT/EP95/00399, filed on Feb. 3, 1995, are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A method of repairing a refractory lining of a metallurgical vessel, the refractory lining having a bottom, a first wall region and a second wall region, the first wall region having an area to be repaired, the second wall region being disposed adjacent the bottom and the first wall region being disposed adjacent the second wall region; the method comprising the steps of:

positioning a template adjacent the first wall region of the refractory lining of the metallurgical vessel;

positioning a means for blocking castable refractory mix adjacent at least a portion of the second wall region of the metallurgical vessel;

blocking the second wall region of the metallurgical vessel with the blocking means to minimize castable refractory mix leaving the area to be repaired of the first wall region;

pouring castable refractory mix into the area to be repaired of the first wall region; and permitting the castable refractory mix to set in the area to be repaired of the first wall region.

2. The method according to claim 1 wherein the step of blocking comprises inflating a hose-shaped inflatable sealing body adjacent the second wall region.

3. The method according to claim 2 comprising the step of deflating the hose-shaped inflatable sealing body after the step of permitting.

4. The method according to claim 3 comprising the step of removing the template and the hose-shaped inflatable sealing body from the first wall region after the step of deflating.

5. The method according to claim 4 comprising the step of protecting the hose-shaped inflatable sealing body from exposure to the castable refractory mix.

6. The method according to claim 5 wherein the step of protecting comprises:

providing an elastic protective cover fastened to the template; and disposing the elastic protective cover between the hose-shaped inflatable sealing body and the second wall region to protect the hose-shaped inflatable sealing body from exposure to the castable refractory mix.

7. The method according to claim 6 comprising the step of pressing the hose-shaped sealing body against the template after the step of deflating.

8. A method of repairing a refractory lining of a metallurgical vessel, with an apparatus, the refractory lining having a bottom, a first wall region and a second wall region, the first wall region having an area to be repaired, the second wall region being disposed adjacent the bottom and the first wall region being disposed adjacent the second wall region; said apparatus comprising: a template for being disposed adjacent the first wall region of the metallurgical vessel to form an annular space for receiving castable refractory mix, the template having a ring-shaped cross-section; and means for blocking the second wall region and for minimizing leakage of castable refractory mix from the area to be repaired; the method comprising the steps of:

providing the template;

providing castable refractory mix; and providing the means for blocking the second wall region and for minimizing leakage of castable refractory mix from the area to be repaired;

the method further comprising the steps of:

positioning the template adjacent the first wall region of the refractory lining of the metallurgical vessel;

positioning the means for blocking castable refractory mix adjacent at least a portion of the second wall region of the metallurgical vessel;

blocking the second wall region of the metallurgical vessel with the blocking means to minimize castable refractory mix leaving the area to be repaired of the first wall region;

pouring the castable refractory mix into the area to be repaired of the first wall region; and permitting the castable refractory mix to set in the area to be repaired of the first wall region.

* * * * *